(12) United States Patent
Faaborg et al.

(10) Patent No.: US 8,972,722 B2
(45) Date of Patent: Mar. 3, 2015

(54) CONTROLLING A CURRENT ACCESS MODE OF A COMPUTING DEVICE BASED ON A STATE OF AN ATTACHMENT MECHANISM

(71) Applicant: Google Inc., Mountain View, CA (US)

(72) Inventors: Alexander Faaborg, Mountain View, CA (US); Adam William Powell, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/095,573

(22) Filed: Dec. 3, 2013

(65) Prior Publication Data

US 2015/0040210 A1 Feb. 5, 2015

Related U.S. Application Data

(60) Provisional application No. 61/859,866, filed on Jul. 30, 2013.

(51) Int. Cl.
*G06F 21/00* (2013.01)
(52) U.S. Cl.
CPC ................................. *G06F 21/00* (2013.01)
USPC ........... 713/164; 709/206; 709/219; 370/329; 340/568; 340/573
(58) Field of Classification Search
CPC ................................. G06F 21/57; G06F 21/53
USPC ......................................................... 713/164
See application file for complete search history.

(56) References Cited

U.S. PATENT DOCUMENTS

| 4,536,754 | A  | * | 8/1985  | Holce et al. ................. 340/568.2 |
| 4,598,394 | A  | * | 7/1986  | Nonaka ....................... 369/44.28 |
| 4,901,291 | A  |   | 2/1990  | Kurata |
| 7,618,260 | B2 |   | 11/2009 | Daniel et al. |
| 7,646,300 | B2 | * | 1/2010  | Stewart et al. ............. 340/572.1 |
| 7,751,285 | B1 |   | 7/2010  | Cain |
| 8,143,983 | B1 | * | 3/2012  | Lauder et al. ................. 335/219 |
| 8,242,868 | B2 | * | 8/2012  | Lauder et al. ................. 335/219 |

(Continued)

FOREIGN PATENT DOCUMENTS

| EP | 0829992    | A2 | 3/1998 |
| EP | 2 407 948  | A1 | 1/2012 |

OTHER PUBLICATIONS

Sten, "LiveView micro display, Extended User Guide," Sony Ericsson, Aug. 2010, Retrieved from http://www-support-downloads.sonymobile.com/mn800/userguide_EN_MN800_1245-8216.2.pdf, 28 pp.

(Continued)

*Primary Examiner* — Mahfuzur Rahman
(74) *Attorney, Agent, or Firm* — Shumaker & Sieffert, P.A.

(57) ABSTRACT

A computing device can receive an indication of a change in the proximity state of a first structure of an attachment mechanism and a second structure of the attachment mechanism. Responsive to receiving the indication, the computing device can be operable to change, based at least in part on the indication, a current access mode provided by the computing device. In some examples, both the computing device and the attachment mechanism may be part of a wearable computing device. In other examples, the computing device may be or be part of a physically separate device from the attachment mechanism.

25 Claims, 6 Drawing Sheets

(56) References Cited

U.S. PATENT DOCUMENTS

| | | | |
|---|---|---|---|
| 8,717,164 B2* | 5/2014 | Williams et al. | 340/539.11 |
| 2001/0052839 A1* | 12/2001 | Nahata et al. | 340/5.72 |
| 2002/0042301 A1* | 4/2002 | Dobrusskin et al. | 463/43 |
| 2002/0084904 A1* | 7/2002 | De La Huerga | 340/573.1 |
| 2002/0115478 A1 | 8/2002 | Fujisawa et al. | |
| 2002/0135615 A1 | 9/2002 | Lang | |
| 2003/0025603 A1 | 2/2003 | Smith | |
| 2003/0204526 A1* | 10/2003 | Salehi-Had | 707/104.1 |
| 2004/0143750 A1 | 7/2004 | Kulack et al. | |
| 2004/0236752 A1* | 11/2004 | Han et al. | 707/10 |
| 2005/0071647 A1 | 3/2005 | Fujinuma et al. | |
| 2006/0136332 A1* | 6/2006 | Ziegler | 705/39 |
| 2008/0007388 A1 | 1/2008 | Au et al. | |
| 2008/0169350 A1* | 7/2008 | Audebert et al. | 235/492 |
| 2010/0056340 A1 | 3/2010 | Ellis et al. | |
| 2010/0112964 A1 | 5/2010 | Yi et al. | |
| 2010/0124949 A1 | 5/2010 | Demuynck et al. | |
| 2010/0274859 A1* | 10/2010 | Bucuk | 709/206 |
| 2012/0050532 A1 | 3/2012 | Rhyins | |
| 2012/0206296 A1 | 8/2012 | Wan | |
| 2012/0243823 A1* | 9/2012 | Giboney | 385/14 |
| 2013/0069787 A1* | 3/2013 | Petrou | 340/573.1 |
| 2014/0162598 A1* | 6/2014 | Villa-Real | 455/411 |

OTHER PUBLICATIONS

Lai, "Sony Ericsson LiveView review," Engadget.com, Dec. 1, 2010, Retrieved from http://www.engadget.com/2010/12/01/sony-ericsson-liveview-review/, 16 pp.

Office Action from U.S. Appl. No. 14/044,558, dated Jan. 6, 2014, 16 pp.

Dellutri et al., "Local Authentication with Bluetooth Enabled Mobile Devices," Proceedings of the Joint International Conference on Automatic and Autonomous Systems and International Conference on Networking and Services, Oct. 2005, 6 pages.

Citizen Eco-Drive Proximity Bluetooth Watch, downloadable from http://blog.princetonwatches.com/citizen-eco-drive-proximity-bluetooth-watch/, downloaded on May 5, 2013, 6 pages.

EZ Secure Proximity Computer Lock, downloadable from http://www.vupointsolutions.com/ex_proximity_computer_lock_clip_on, downloaded on May 5, 2013, 2 pages.

U.S. Appl. No. 14/044,558, filed Oct. 2, 2013.

Response to Office Action dated Jan. 6, 2014, from U.S. Appl. No. 14/044,558, filed Apr. 7, 2014, 20 pp.

International Search Report and Written Opinion from International Application No. PCT/US2014/047868, dated Nov. 10, 2014, 8 pp.

Notice of Allowance from U.S. Appl. No. 14/044,558, dated Nov. 3, 2014, 12 pp.

\* cited by examiner

CONTROLLING A CURRENT ACCESS MODE OF A COMPUTING DEVICE BASED ON A STATE OF AN ATTACHMENT MECHANISM

The application claims the benefit of U.S. Provisional Application No. 61/859,866, filed Jul. 30, 2013, the entire content of which is hereby incorporated by reference.

BACKGROUND

Some computing devices are configured to operate in multiple access modes, such as a reduced access mode (in which the computing device permits a user of the computing device to access a reduced set of functionality provided by the computing device) and a standard access mode (in which the computing device permits a user to access a relatively larger set of functionality provided by the computing device), and/or a full access mode (in which the computing device permits the user to access a complete set of functionality provided by the computing device). In some examples, a computing device may present one or more security challenges that a user is required to complete in order to change the operating access mode from a reduced access mode to a standard or full access mode. For example, a computing device may output, for display at a display device, a user interface screen including one or more user interface elements that prompt a user to input security information, such as a password, a personal identification number (PIN), a pattern or biometric data (e.g., fingerprint, voice, image, or the like). In response to receiving indications of the security information, the computing device and/or a remote computing device may compare the input security information to a saved copy of the security information, and, upon confirming a match, may change from the reduced access mode to the standard or full access mode.

SUMMARY

In one example, the disclosure describes a method that includes receiving, by a computing device, an indication of a change in a proximity state between a first structure of an attachment mechanism and a second structure of the attachment mechanism. In accordance with this example, the method also includes, responsive to receiving the indication, changing, by the computing device, based at least in part on the indication, a current access mode provided by the computing device.

In another example, the disclosure describes a wearable computing device that includes an attachment mechanism comprising a first structure and a second structure, one or more processors, and an access mode module operable by the one or more processors. In accordance with this example, the access mode module can be operable by the one or more processors to receive an indication of a change in a proximity state between the first structure and the second structure from a non-proximate state to a proximate state, and, responsive to receiving the indication, output a security challenge. Additionally, the access mode module can be operable by the one or more processors to receive an indication of a response to the security challenge, and change, based at least in part on the indication that the first structure of the attachment mechanism is proximate to with the second structure of the attachment mechanism and the indication of the response to the security challenge, the current access mode provided by the wearable computing device from a reduced access mode to an increased access mode.

In an additional example, the disclosure describes a computer-readable storage device storing instructions that, when executed, cause at least one processor to receive an indication of a change in a proximity state between a first structure of an attachment mechanism and a second structure of the attachment mechanism. In accordance with this example, the instructions also, when executed, cause the at least one processor to receive device context information relating to at least one of a geographic location of the attachment mechanism, motion of the attachment mechanism, and a time at which the at least one processor received the indication of the change in the proximity state between the first structure of the attachment mechanism and the second structure of the attachment mechanism. Additionally, the instructions, when executed, cause the at least one processor to change, based at least in part on the indication of the change in the proximity state and the device context information, a current access mode provided by the at least one processor.

The details of one or more examples are set forth in the accompanying drawings and the description below. Other features, objects, and advantages of the disclosure will be apparent from the description and drawings, and from the claims.

DETAILED DESCRIPTION

Figure 1:
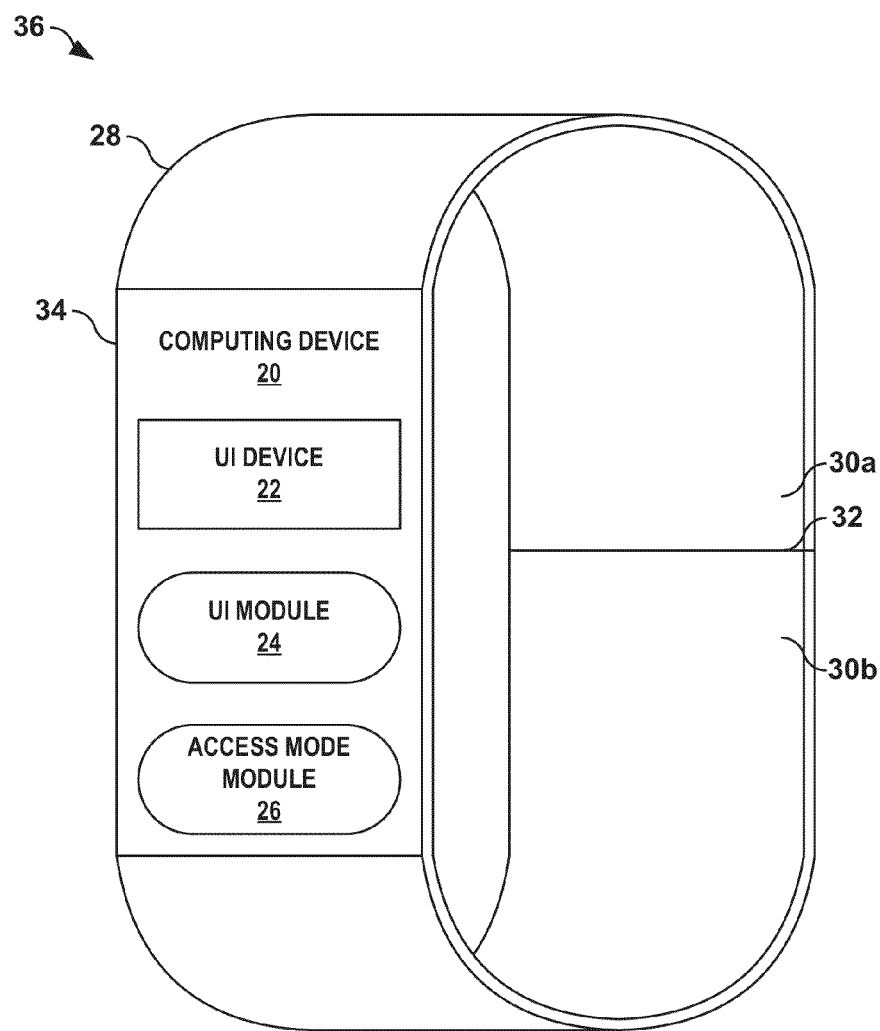
FIG. 1 is a conceptual block diagram illustrating an example computing device that controls a current access mode provided by the computing device based at least in part on the state of an attachment mechanism, in accordance with one or more techniques of the present disclosure.

Techniques according to the disclosure describe a computing device that is operable to control a current access mode provided by the computing device based at least in part on a current state of an attachment mechanism. In some examples, the computing device may be part of a wearable computing device that includes an attachment mechanism, such as a smart watch, bracelet, wrist or ankle band, etc. In some of these examples, the wearable computing device may include the computing device and the attachment mechanism. In other examples, the computing device and the attachment mechanism may be physically distinct devices and may be communicatively coupled (e.g., by a wired and/or wireless connection).

In example implementations, the attachment mechanism includes first and second structures of a clasp, clip, snap, buckle or other mechanism operable to physically secure the attachment mechanism when worn by the user. As described herein, the computing device may be operable to, responsive to receiving an indication of a change in proximity state between the first structure and the second structure, change a current access mode provided by the computing device. For example, the computing device can be operable to change the current access mode from a reduced access mode to an increased access mode (e.g., a standard or full access mode) in response to receiving an indication of a change of the proximity state of the first and second structures from a non-proximate state to a proximate state (e.g., an indication that the attachment mechanism is physically secured in a configuration to be worn, such as a closing or securing of a band, clasp, clip, snap, buckle or other mechanism. As another example, the computing device can be operable to change the current access mode from the increased access mode to the reduced access mode in response to receiving an indication of a change of the proximity state of the first and second structures from proximate state to non-proximate state (e.g., an indication that the attachment mechanism is no longer physically secured in the worn configuration, such as an opening of a band, clasp, clip, snap, buckle or other mechanism).

In some examples, the proximity state may be whether the first and second structures are proximate to each other or not (e.g., without touching each other). For example, the first and second structures may include a magnet and a magnetic switch such that the magnetic switch opens and closes depending upon whether the first and second structures are in a proximate state or a non-proximate state. As another example, the first and second structures may include structures that inductively or capacitively couple when brought within less than a threshold distance of each other such that, when the first and second structures are coupled, they are in the proximate state and, when the first and second structures are not coupled, they are in the non-proximate state. In other examples, the proximity state may include a contact state, where the first and second structures are physically contacting each other in the contacted state and not physically contacting each other in the non-contacted state.

In some examples, the computing device can be operable to output a security challenge in response to receiving an indication of a change of the proximity state of the first and second structures from a non-proximate state to a proximate state. The security challenge may include a user interface screen that prompts a user of the wearable computing device to input a security challenge answer, such as a password, a PIN, a pattern, biometric data (e.g., fingerprint, voice, image, or the like), etc. Responsive to receiving the input security challenge answer, the computing device (and/or a remote computing device) may compare the security challenge answer to a stored security challenge answer. Responsive to verifying the input security challenge answer in view of the stored security challenge answer or receiving an indication that the input security challenge answer has been verified, the computing device may change the current access mode provided by the computing device from the reduced access mode to the increased access mode.

In some implementations, the computing device is operable to remain in the increased access mode until receiving an indication of a change of the proximity state of the first and second structures from the proximate state to the non-proximate state, rather than reverting to the reduced access mode after a period of inactivity or a threshold time after the user has last interacted with the computing device. Because the proximate state of the first and second structures indicates that the attachment mechanism is closed or clasped and the user passed the security challenge after closing the attachment mechanism, maintaining the computing device in the increased access mode until the proximity state of the first and second structures changes may not reduce security of the computing device. Moreover, by not reverting to the reduced access mode while the first and second structures are in the proximate state even after a period of inactivity, the computing device may allow the user to more easily interact with a larger or complete set of functionality provided by the computing device, e.g., without having to respond to another security challenge each time the user wants to interact with the computing device.

FIG. 1 is a conceptual block diagram illustrating an example computing device 20 that can change a current access mode based at least in part on the state of an attachment mechanism, in accordance with one or more techniques of the present disclosure. In the example of FIG. 1, a wearable computing device 36 includes a computing device 20 and the attachment mechanism, which in the example of FIG. 1 includes a band 28. In other examples, instead of a wearable computing device 36 including a computing device 20 and a band 28, the techniques described herein may be implemented using two or more physically separate devices, e.g., computing device 20 may be separate from band 28 (which is an attachment mechanism). In some such examples, band 28 may be part of an attachment mechanism, and computing device 20 may be a separate device or part of a separate device, e.g., computing device 20 may be or may be part of a separate wearable computing device or separate mobile computing device.

In the example illustrated in FIG. 1, computing device 20 includes at least one user interface (UI) device 22, a UI module 24, and an access mode module 26. In some examples, UI device 22 and other electronic components of computing device 20 may be at least partially enclosed by a housing 34. Additionally, wearable computing device 36 can include a band 28 or other member, such as a strap or frame, for physically securing wearable computing device 36 when being worn by a user. In the example of FIG. 1, band 28 is mechanically coupled to housing 34. In some examples, instead of band 28 and housing 34 being separate structures mechanically coupled to each other, band 28 and housing 34 may be a single, unitary structure. Other examples of wearable computing device 36 and/or computing device 20 that implement techniques of this disclosure may include additional components not shown in FIG. 1.

As shown in the example of FIG. 1, the first portion of band 28 and second portion of band 28 mechanically connect at clasp 32. Band 28 includes a first structure 30a and a second structure 30b, such as structures of a clasp, clip, snap, buckle or other mechanism operable to physically secure wearable computing device 36 when worn by a user. In the example shown in FIG. 1, first structure 30a includes a first portion of band 28 and second structure 30b includes a second portion of band 28. Other examples of structures of a mechanism operable to physically secure wearable computing device 36 when worn by a user include a pin and a pin contact, a pressure sensor incorporated in one portion of the mechanism operable to physically secure wearable computing device 36, a proximity structure incorporated in one portion of the mechanism operable to physically secure wearable computing device 36, a magnetic reed switch incorporated in one portion of the mechanism operable to physically secure wearable computing device 36 and a magnetic in the complementary portion of the mechanism, etc.

In other examples, first structure 30a and second structure 30b may be structures embedded in or attached to band 28, but may not be part of a clasp, clip, snap, buckle or other mechanism operable to physically secure wearable computing device 36 when worn by the user. For example, first structure 30a and second structure 30b can include first and second portions of an electrical circuit within or attached to band 28.

Examples of wearable computing device 36 can include, but are not limited to, a smart watch, bracelet, wrist band, ankle band, etc.

Computing device 20 can include at least one UI device 22. A user associated with computing device 20 may interact with computing device 20 by providing various user inputs into computing device 20, e.g., using at least one UI device 22. In some examples, the at least one UI device 22 is configured to receive tactile, audio, or visual input. In addition to receiving input from a user, UI device 22 can be configured to output content such as a graphical user interface (GUI) for display, e.g., at a display device associated with computing device 20. In some examples, UI device 22 can include a display and/or a presence-sensitive input device. In some examples, the display and the presence-sensitive input device may be integrated into a presence-sensitive display, which displays the GUI and receives input from the user using capacitive, inductive, and/or optical detection at or near the presence sensitive display. In other examples, the display device can be physically separate from a presence-sensitive device associated with computing device 20.

As shown in FIG. 1, computing device 20 also can include UI module 24. UI module 24 can perform one or more functions to receive indication of input, such as user input, and send the indications of the input to other components associated with computing device 20, such as access mode module 26. For example, UI module 24 may receive an indication of a gesture performed by the user at UI device 22. UI module 24 may also receive information from components associated with wearable computing device 20, such as access mode module 26. Using the information, UI module 24 may cause other components associated with computing device 20, such as UI device 22, to provide output based on the information. For instance, UI module 24 may receive information from access mode module 26 and cause UI device 22 to display information at a display device associated with computing device 20 (e.g., which is part of computing device 20 or is operably coupled to computing device 20).

UI module 24 may be implemented in various ways. For example, UI module 24 can be implemented as a downloadable or pre-installed application or "app." In another example, UI module 24 can be implemented as part of a hardware unit of computing device 20. In another example, UI module 24 can be implemented as part of an operating system provided by computing device 20.

Computing device 20 can also include access mode module 26. Access mode module 26 can be implemented in various ways. For example, access mode module 26 can be implemented as a downloadable or pre-installed application or "app." In other examples, access mode module 26 can be implemented as part of a hardware unit of computing device 20 or as part of an operating system provided by computing device 20.

Band 28 includes first structure 30a and second structure 30b, which, in some examples, can be a first portion and a second portion of band 28, respectively. For example, first structure 30a and second structure 30b may be conductive structures integral to a clasp, clip, snap, buckle or other mechanism operable to physically secure the computing device when worn by the user. Other example first and second structures may include, for example, a first portion and a second portion of an electrical circuit disposed on or within band 28, a pin coupled to first portion 30a and/or second portion 30b and a corresponding pin contact on the opposite portion of band 28, etc., where the structures are in contact and form a closed connection when band 28 is in a worn configuration. In other examples, first structure 30a may include a magnet and second structure 30b may include a magnetic Reed switch, which changes state when first structure 30a is brought proximate to second structure 30b.

Access mode module 26 can receive data from components associated with computing device 20 and/or wearable computing device 36, such as UI module 24 and/or band 28. Access mode module 26 can be operable to perform a predetermined action in response to receiving the data. For example, access mode module 26 can be operable to receive an indication of a proximity state between first structure 30a and second structure 30b. The proximity state between first structure 30a and second structure 30b may indicate whether clasp 32 is closed or open and, therefore, provide an indication as to whether wearable computing device 20 is physically secured in a configuration to be worn. For example, when first structure 30a and second structure 30b are in a proximate state, clasp 32 is closed, as the two ends of band 28 are proximate to or contacting each other. Conversely, when first structure 30a and second structure 30b are in a non-proximate state, clasp 32 is open, as the two ends of band 28 are not proximate to or contacting each other.

In accordance with one or more aspects of this disclosure, access mode module 26 can be operable to change a current access mode provided by computing device 20 based at least in part on a received indication of the proximity state of first structure 30a and second structure 30b. In some examples, the possible access modes provided by computing device 20 can include a reduced access mode and an increased access mode (e.g., standard access mode or full access mode). In the reduced access mode, computing device 20 can be operable to allow access to a reduce set of functionality, e.g., compared to all the functionality that computing device 20 can provide. In the increased access mode, computing device 20 can be operable to allow access to a larger or complete set of functionality.

In some examples, access mode module 26 can be operable to change a current access mode provided by computing device 20 from an increased access mode to a reduced access mode responsive to receiving an indication of a change of proximity state of first structure 30a and second structure 30b from a proximate state to a non-proximate state. One or both of first structure 30a and second structure 30b may be communicatively coupled to access mode module 26, e.g., by an electrical circuit, such that one or both of first structure 30a and second structure 30b can generate a signal that is transmitted to access mode module 26, e.g., when the proximity state changes, or when first structure 30a is proximate to or contacting second structure 30b. Thus, in some examples, the indication that the proximity state of first structure 30a and second structure 30b from a proximate state to a non-proximate state may be the cessation of access mode module 26 receiving an electrical signal from first structure 30a and/or second structure 30b, which can indicate that first structure 30a is no longer proximate to or contacting second structure 30b. When first structure 30a is not proximate to or contacting second structure 30b, this indicates that band 28 is not closed, i.e., clasp 32 is not closed or connected, which can indicate that a user is not wearing wearable computing device 36. Hence, responsive to receiving the indication of the change of the proximity state of first structure 30a and second structure 30b from the proximate state to the non-proximate state, access mode module 26 can be operable to change the current access mode provided by computing device 20 from an increased access mode to a reduced access mode.

In some examples, access mode module 26 can be operable to change the current access mode provided by computing device 20 from a reduced access mode to an increased access mode responsive to receiving an indication of a change of proximity state of first structure 30a and second structure 30b from a non-proximate state to a proximate state. In some examples, the indication that the proximity state of first structure 30a and second structure 30b from the non-proximate state to the proximate state may be access mode module 26 beginning to receive an electrical signal from first structure 30a and/or second structure 30b, which can indicate that first structure 30a is proximate to or contacting second structure 30b. In some instances, first structure 30a being proximate to or contacting second structure 30b can indicate that clasp 32 is closed, which provides an indication that band 28 is physically secured in a configuration to be worn, and may provide an indication that a user is likely wearing wearable computing device 36. Thus, access mode module 26 can be operable to change the current access mode provided by computing device 20 from the reduced access mode to the increased access mode responsive to receiving the indication of a change of proximity state of first structure 30a and second structure 30b from the non-proximate state to the proximate state.

In some examples, access mode module 26 can be operable to output a security challenge in response to receiving the indication of a change of the proximity state of the first and second structures from the non-proximate state to the proximate state. The security challenge may include a user interface screen, e.g., displayed at UI device 22 and/or output device(s) 46, that prompts a user of wearable computing device 36 to input a security challenge answer, such as a password, a PIN, a pattern, biometric data (e.g., fingerprint, voice, image, or the like), etc. Responsive to receiving the input security challenge answer, access mode module 26 can be operable to compare the input security challenge answer to a stored security challenge answer. Responsive to verifying the input security challenge answer in view of the stored security challenge answer, access mode module 26 can be operable to change the current access mode provided by computing device 20 from the reduced access mode to the increased access mode.

In some implementations, once access mode module 26 receives the indication that first structure 30a and second structure 30b are in a proximate state, access mode module 26 can be operable to cause computing device 20 to remain in the increased access mode until access mode module 26 receives an indication of a change of the proximity state of first structure 30a and second structure 30b to the non-proximate state, instead of causing computing device 20 to revert to the reduced access mode after a predetermined length of inactivity. As the proximate state may indicate that a user is likely wearing wearable computing device 36, this may allow the user to interact more completely or fully with computing device 20 (e.g., by providing user input and/or observing outputs of computing device 20 using UI device 22) without having to pass a security challenge each time the user wishes to interact with computing device 20. This may facilitate use of computing device 20 by the user, while maintaining security of computing device 20, as the proximity state of first structure 30a and second structure 30b indicates that the wearable computing device 36 has not been removed from the user.

Figure 2:
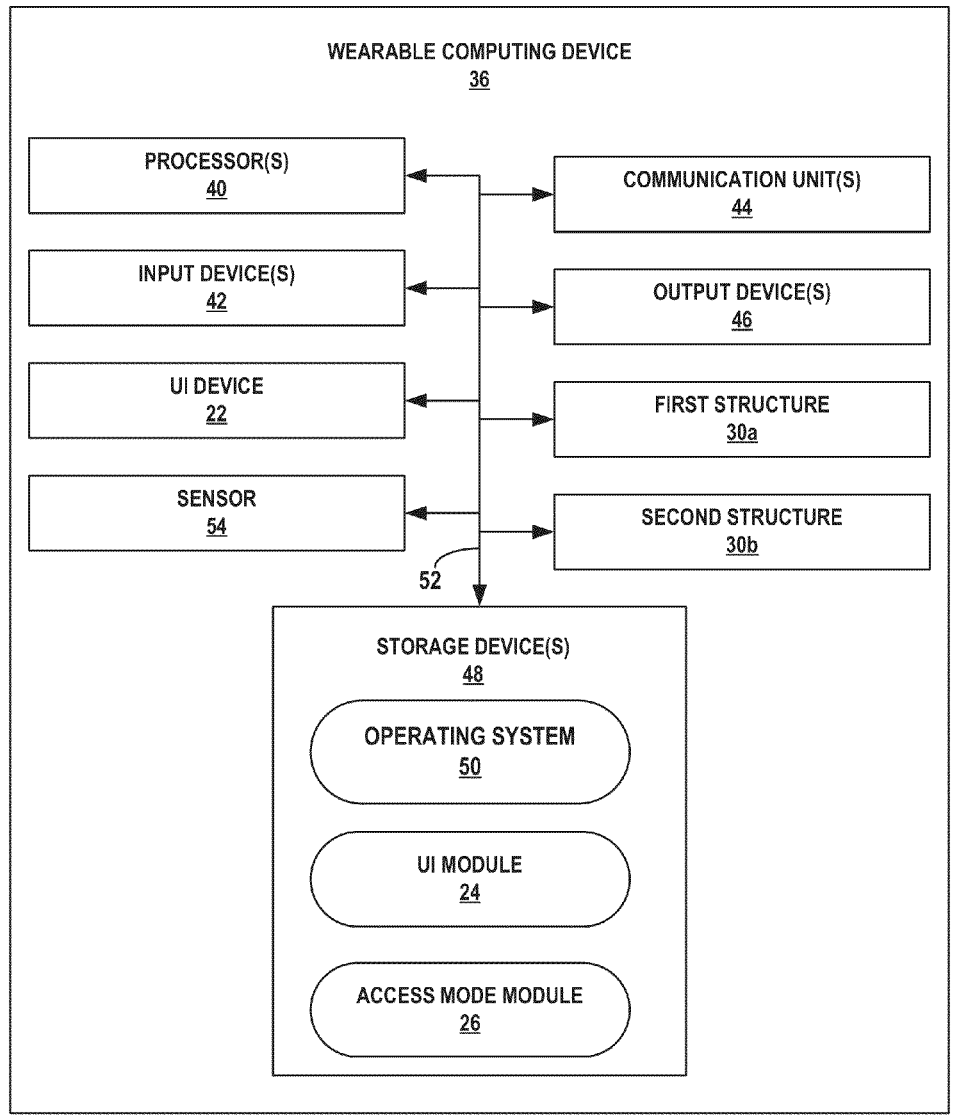
FIG. 2 is a block diagram illustrating further details of one example of a wearable computing device as shown in FIG. 1, in accordance with one or more techniques of the present disclosure.

FIG. 2 is a block diagram illustrating further details of one example of a wearable computing device shown in FIG. 1, in accordance with one or more techniques of the present disclosure. FIG. 2 illustrates only one particular example of wearable computing device 36 as shown in FIG. 1, and many other examples of wearable computing device 36 may be used in other instances.

As shown in the example of FIG. 2, wearable computing device 36 includes one or more processors 40, one or more input devices 42, one or more communication units 44, one or more output devices 46, one or more storage devices 48, and user interface (UI) device 22. In the example of FIG. 2, wearable computing device 36 further includes UI module 24, access mode module 26, and operating system 50, which are executable by one or more processors 40. Each of components 22, 40, 42, 44, 46, and 48 are coupled (physically, communicatively, and/or operatively) using communication channels 52 for inter-component communications. In some examples, communication channels 52 may include a system bus, a network connection, an inter-process communication data structure, or any other method for communicating data. UI module 24, access mode module 26, and operating system 50 may also communicate information with one another, as well as with other components in wearable computing device 36.

One or more processors 40, in one example, are configured to implement functionality and/or process instructions for execution within wearable computing device 36. For example, processors 40 may be capable of processing instructions stored by storage device 48. Examples of one or more processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store information within wearable computing device 36 during operation. Storage devices 48, in some examples, include a computer-readable storage medium or computer-readable storage device. In some examples, storage devices 48 include a temporary memory, meaning that a primary purpose of storage device 48 is not long-term storage. Storage devices 48, in some examples, include a volatile memory, meaning that storage device 48 does not maintain stored contents when power is not provided to storage device 48. Examples of volatile memories include random access memories (RAM), dynamic random access memories (DRAM), static random access memories (SRAM), and other forms of volatile memories known in the art. In some examples, storage devices 48 are used to store program instructions for execution by processors 40. Storage devices 48, in some examples, are used by software or applications running on wearable computing device 36 (e.g., access mode module 26) to temporarily store information during program execution.

In some examples, storage devices 48 may further include one or more storage device 48 configured for longer-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Wearable computing device 36, in some examples, also includes one or more communication units 44. Wearable computing device 36, in one example, utilizes communication unit 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth, 3G, and WiFi radios computing devices as well as Universal Serial Bus (USB). In some examples, wearable computing device 36 utilizes communication unit 44 to wirelessly communicate with an external device such as a server.

Wearable computing device 36, in one example, also includes one or more input devices 42. Input device 42, in some examples, is configured to receive input from a user through tactile, audio, or video sources. Examples of input device 42 include a presence-sensitive device, such as a presence-sensitive display, a mouse, a keyboard, a voice responsive system, video camera, microphone or any other type of device for detecting a command from a user. In some examples, a presence-sensitive display includes a touch-sensitive display.

One or more output devices 46 may also be included in wearable computing device 36. Output device 46, in some examples, is configured to provide output to a user using tactile, audio, or video stimuli. Output device 46, in one example, includes a presence-sensitive display, a sound card, a video graphics adapter card, or any other type of device for converting a signal into an appropriate form understandable to humans or machines. Additional examples of output device 46 include a speaker, a cathode ray tube (CRT) monitor, a liquid crystal display (LCD), organic light emitting diode (OLED), or any other type of device that can generate intelligible output to a user. In some examples, UI device 22 may include functionality of one or more of input devices 42 and/or output devices 46.

Wearable computing device 36 also can include UI device 22. In some examples, UI device 22 is configured to receive tactile, audio, or visual input. In addition to receiving input from a user, UI device 22 can be configured to output content such as a GUI for display at a display device, such as a presence-sensitive display. In some examples, UI device 22 can include a presence-sensitive display that displays a GUI and receives input from a user using capacitive, inductive, and/or optical detection at or near the presence sensitive display. In some examples, UI device 22 is both one of input devices 44 and one of output devices 46.

In some examples, UI device 22 of wearable computing device 36 may include functionality of input devices 42 and/or output devices 46. In some examples, a presence-sensitive device may detect an object at and/or near the presence-sensitive device. As one example range, a presence-sensitive device may detect an object, such as a finger or stylus, which is within two inches or less of the presence-sensitive device. The presence-sensitive device may determine a location (e.g., an (x,y) coordinate) of the presence-sensitive device at which the object was detected. In another example range, a presence-sensitive device may detect an object six inches or less from the presence-sensitive device. Other example ranges are also possible. The presence-sensitive device may determine the location of the device selected by the object using capacitive, inductive, and/or optical recognition techniques. In some examples, the presence-sensitive device provides output to a user using tactile, audio, or video stimuli as described with respect to output device 46.

Wearable computing device 36 may include operating system 50. Operating system 50, in some examples, controls the operation of components of wearable computing device 36. For example, operating system 50, in one example, facilitates the communication of UI module 24 and access mode module 26 with processors 40, communication units 44, storage devices 48, input devices 42, and output devices 46. UI module 24 and access mode module 26 can each include program instructions and/or data that are executable by wearable computing device 36 (e.g., by one or more processors 40). As one example, UI module 24 can include instructions that cause wearable computing device 36 to perform one or more of the operations and actions described in the present disclosure.

Wearable computing device 36 can include additional components that, for clarity, are not shown in FIG. 2. For example, wearable computing device 36 can include a battery to provide power to the components of wearable computing device 36. Similarly, the components of wearable computing device 36 shown in FIG. 2 may not be necessary in every example of wearable computing device 36. For example, in some configurations, wearable computing device 36 may not include communication unit 44.

In some examples, components of wearable computing device 36 may be divided between a computing device 20 and an attachment mechanism. For example, computing device 20 may include at least one of: one or more processors 40, one or more input devices 42, UI device 22, sensor 54, one or more communications unit(s), one or more output devices 46, and/or one or more storage devices 48. The attachment mechanism can include first structure 30a and second structure 30b. In some examples, the attachment mechanism can additionally and optionally include one or more other components illustrated in FIG. 2, such as at least one of: one or more processors 40, one or more input devices 42, UI device 22, sensor 54, one or more communications unit(s), one or more output devices 46, and/or one or more storage devices 48. In other examples, computing device 20 may be one or more processors 40, and the other components illustrated in FIG. 2 may be part of a mobile computing device, wearable computing device, etc.

In accordance with one or more aspects of this disclosure, access mode module 26 is operable by one or more processors 40 to receive, from one or both of first structure 30a and second structure 30b, an indication of change in a proximity state of first structure 30a and second structure 30b. The possible proximity states for first structure 30a and second structure 30b can include, for example, a proximate state and a non-proximate state. In some examples, the proximity state may be indicated by an electrical signal that indicates that first structure 30a and second structure 30b are in proximity or in contact, or an absence of an electrical signal, which indicates that first structure 30a and second structure 30b are not in proximity or in contact. For example, first structure 30a can include a first wire extending through band 28 from a voltage source to a first electrical contact at an end of the first portion of band 28 (e.g., proximate to clasp 32), and second structure 30b can include a second wire can include a second wire extending through band 28 from the voltage source to a second electrical contact at an end of the second portion of band 28 (e.g., proximate to clasp 32). The first electrical contact and second electrical contact can be positioned such that, when clasp 32 is closed, the first and second wires and first and second electrical contacts form a closed circuit, and an electrical current can flow. Conversely, when clasp 32 is open, the electrical circuit formed by the first and second wires and first and second electrical contacts will be open, and no current will flow through the circuit. A component of wearable computing device 36 can sense the start or end of the electrical current flowing through the circuit and generate the indication of the change in the proximity state of first structure 30a and second structure 30b. Access mode module 26 can then receive the indication.

In other examples, the change in the proximity state of first structure 30a and second structure 30b can be indicated by a transient electrical signal generated by one or both of first structure 30a and second structure 30b when the proximity state changes. Other, similar techniques may be used to determine whether the first structure 30a and second structure 30b are in a proximate or a non-proximate state, such as a pressure-activated switch, a spring-loaded pin, a magnetic switch and magnet, etc.

Responsive to receiving the indication of the change in the proximity state of first structure 30a and second structure 30b, access mode module 26 can be operable by one or more processors 40 to change, based at least in part on the indication, a current access mode provided by one or more processors 40, e.g., by one or more processors 40. The access modes of wearable computing device 36 can include a reduced access mode and an increased access mode. When operating in the reduced access mode, one or more processors 40 can be operable to permit a user of wearable computing device 36 to access a reduced set of functionality provided by wearable computing device 36, such as viewing notifications, a clock, a limited number of widgets, etc. When operating in the increased access mode, one or more processors 40 can be operable to permit the user of wearable computing device 36 to access a larger or a complete set provided by functionality of wearable computing device 36.

For example, responsive to receiving an indication that the proximity state between first structure 30a and second structure 30b has changed from a non-proximate state to a proximate state, access mode module 26 can be operable to change the current access mode provided by one or more processors 40 from the increased access mode to the reduced access mode. Because first structure 30a and second structure 30b moving from the proximate state to the non-proximate state can indicate that wearable computing device 36 is being removed from the user (e.g., either by the user opening clasp 32 and removing wearable computing device 36 or band 28 being broken), access mode module 26 can be operable to cause one or more processors 40 to initiate the reduced access mode in order to reduce the likelihood of an unauthorized user accessing functionality of wearable computing device 36 when first structure 30a is not proximate to second structure 30b.

As another example, responsive to receiving an indication that the proximity state between first structure 30a and second structure 30b has changed from the non-proximate state to the proximate state, access mode module 26 can be operable to change the current access mode provided by one or more processors 40 from the reduced access mode to the increased access mode. In some implementations, while first structure 30a and second structure 30b remain in the proximate state (e.g., indicated by periodic indications of the proximate state or an absence of an indication of a change in proximity state from proximate to non-proximate), access mode module 26 can be operable to cause the access mode provided by one or more processors 40 to remain in the increased access mode.

In some examples, access mode module 26 can be operable to output a security challenge in response to receiving the indication of a change of the proximity state of the first and second structures from the non-proximate state to the proximate state. The security challenge may include a user interface screen, e.g., displayed at UI device 22 and/or output device(s) 46, that prompts a user of wearable computing device 36 to input a security challenge answer, such as a password, a PIN, a pattern, biometric data (e.g., fingerprint, voice, image, or the like), etc. Responsive to receiving the input security challenge answer, access mode module 26 can be operable to compare the input security challenge answer to a stored security challenge answer. Responsive to verifying the input security challenge answer in view of the stored security challenge answer, access mode module 26 can be operable to change the current access mode provided by one or more processors 40 from the reduced access mode to the increased access mode.

In some examples, access mode module 26 can be operable to receive at least one additional indication and to determine whether to change the current access mode based at least in part on the indication of the change in the proximity state of first structure 30a and second structure 30b and the at least one additional indication. The at least one additional indication can relate to additional device context information that may be relevant to determining whether wearable computing device 36 is being worn by a user and/or if wearable computing device 36 is located in a relatively secure or a relatively less secure location.

For example, access mode module 26 can be operable to receive location information from, e.g., a global positioning satellite (GPS) system, a wireless network with which wearable computing device 36 is communicating, e.g., using one or more of communication units 44, etc. In situations in which the access mode module 26 is operable to collect location information, the user(s) associated with wearable computing device 36 may be provided with an opportunity to control whether access mode module 26 collects and/or uses the user's current location. In addition, certain information, such as the user's location, may be treated in one or more ways before it is stored or used, so that personally identifiable information is removed. For example, a user's identity may be treated so that no personally identifiable information can be determined for the user, or a user's location may be generalized as to where location information is obtained (such as to a city, ZIP code, or state level), so that a particular location of a user cannot be determined. Thus, the user(s) of wearable computing device 36 may have control over how information about the user is collected and used.

Access mode module 26 can be operable to base the determination of whether to change the current access mode provided by one or more processors 40 at least in part on the indication of the change in the proximity state of first structure 30a and second structure 30b and the location information. For example, access mode module 26 can receive location information that indicates that wearable computing device 36 is located in a relatively secure location, such as a location designated as the user's home or office. Based on this location information, in some examples, access mode module 26 may not immediately change the current access mode provided by one or more processors 40 responsive to receiving the indication of the change in the proximity state of first structure 30a and second structure 30b. Instead, access mode module 26 can be operable to wait for a predetermined amount of time, e.g., 1, 2, 5, or 10 minutes, after receiving the indication of the change in the proximity state of first structure 30a and second structure 30b before changing the current access mode provided by one or more processors 40 to the reduced access mode. This time delay may allow the user to temporarily remove wearable computing device 36, e.g., to wash his or her hands, replace wearable computing device 36 in the worn configuration, and not be required to pass the security challenge again to place wearable computing device 36 in the increased access mode.

However, in some examples, when the location information indicates that wearable computing device 36 is located in a less secure location, such as away from the user's home, access mode module 26 can be operable to substantially immediately change, based at least in part on the indication of a change of the proximity state of the first and second structures from the proximate state to the non-proximate state the current access mode provided by one or more processors 40 to the reduced access mode. This may increase security of wearable computing device 36 by reducing an amount of time during which one or more processors 40 is providing an increased access mode while computing device is in a configuration that indicates wearable computing device 36 is not being worn.

In some examples, wearable computing device 36 can further include at least one sensor 54 that can output a signal indicative of movement of wearable computing device 36. Such a sensor may include, for example, an accelerometer, a gyroscope, a camera, etc. Access mode module 26 can be operable to receive an indication, based at least in part on the output of the sensor 54, that wearable computing device 36 is moving. In some examples, the indication may be an output of an accelerometer or a gyroscope that indicates the wearable computing device 36 is moving. In other examples, the indication may be based on a comparison (e.g., by one or more processors 40) of two images captured by a camera at different times (e.g., separated by fractions of a second, seconds or minutes). In instances in which the images are different, the one or more processors 40 may generate an indication that wearable computing device 36 is moving or has moved. In instances in which the images are substantially the same, the one or more processors 40 may generate an indication that wearable computing device 36 is substantially stationary or has not moved.

Access mode module 26 can be operable to determine whether to change the current access mode provided by one or more processors 40 based at least in part on the indication of whether wearable computing device 36 is moving. For example, when the proximity state between first structure 30*a* and second structure 30*b* is proximate (indicating that wearable computing device 36 is likely being worn), movement of wearable computing device 36 detected by sensor 54 is a further indicator that wearable computing device 36 is being worn. On the other hand, an indication, received from sensor 54, that wearable computing device 36 is not moving, combined with an indication that the proximity state between first structure 30*a* and second structure 30*b* is proximate, may indicate that wearable computing device 36 is clasped or closed but not being worn. In this way, the indication that wearable computing device 36 is moving may provide further information that access mode module 26 can analyze when determining whether to change the current access mode provided by one or more processors 40.

In some examples, access mode module 26 can be operable to receive a time of day at which access mode module 26 received the indication in the change of the proximity state of first structure 30*a* and second structure 30*b*. In some instances, the time of day may indicate whether computing device is likely to be in a relatively secure location or a less secure location. For example, if the time of day indicates that is the middle of the night, it may be more likely that the user (and wearable computing device 36) is located at a relatively more secure location (e.g., a location at which the user is sleeping). On the other hand, if the time of day indicates that it is the middle of the day, it may be more likely that the user (and wearable computing device 36) is located in a relatively less secure location (e.g., away from the user's home). Thus, in some examples, during certain, predetermined times of day (e.g., the middle of the day), access mode module 26 may be operable to wait a shorter amount of time before changing the current access mode to the reduced access mode in response to receiving an indication of a change in the proximity state of first structure 30*a* and second structure 30*b* from the proximate state to the non-proximate state. Conversely, in some examples, during certain, predetermined times of day (e.g., the middle of the night), access mode module 26 may be operable to wait a longer amount of time before changing the current access mode to the reduced access mode in response to receiving an indication of a change in the proximity state of first structure 30*a* and second structure 30*b* from the proximate state to the non-proximate state.

In some examples, the information based upon which access mode module 26 makes the determination to change the current access mode provided by one or more processors 40 may be configurable by a user of wearable computing device 36. For example, using UI device 22 and or input device(s) 42, the user may interact with one or more user interface screen presented at a display by UI module 24 to customize the behavior of access mode module 26. In various examples, access mode module 26 can be operable to allow the user to change the information considered (e.g., location, time of day, information from sensor 54, etc.), the time delay between receiving an indication of a change of the proximity state from proximate to non-proximate and when access mode module 26 changes the current access mode to the reduced access mode, whether access mode module 26 outputs a security challenge in response to receiving an indication of a change of the proximity state from proximate to non-proximate, etc. In other examples, at least some of these parameters of access mode module 26 may be predefined and not user configurable.

Figure 3:
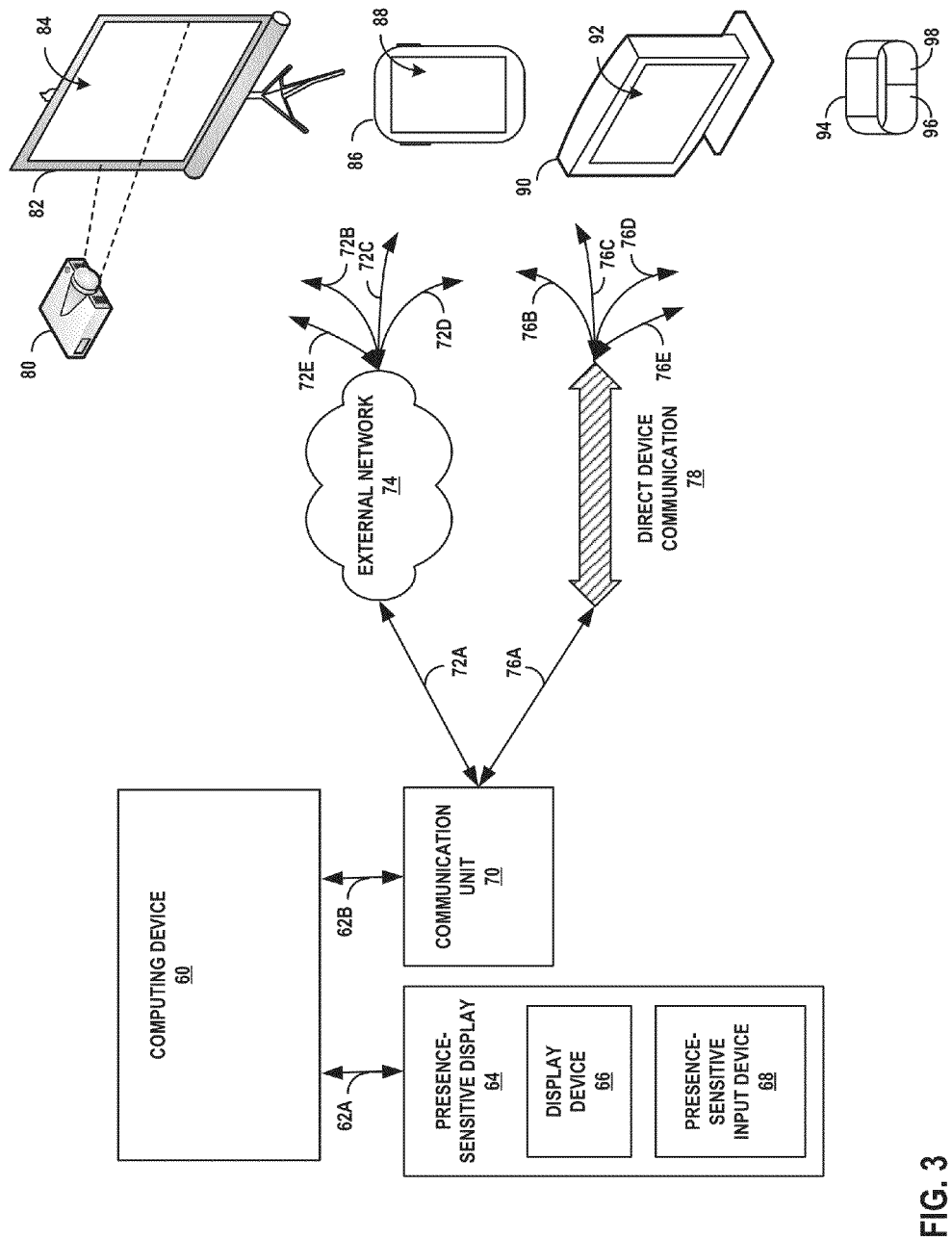
FIG. 3 is a conceptual block diagram illustrating an example computing device that outputs graphical content for display at a remote device and can receive indications of a state of a remote attachment mechanism from the remote attachment mechanism, in accordance with one or more techniques of the present disclosure.

FIG. 3 is a block diagram illustrating an example computing device (e.g., computing device 20 of FIG. 1 and/or one or more processors 40 of FIG. 2) that outputs graphical content for display at a remote device and can receive indications of a state of a remote attachment mechanism, in accordance with one or more techniques of the present disclosure. Graphical content, generally, may include any visual information that may be output for display, such as text, images, a group of moving images, etc. The example shown in FIG. 3 includes a computing device 60, presence-sensitive display 64, communication unit 70, projector 80, projector screen 82, mobile device 86, visual display device 90, and attachment mechanism 94. Although shown for purposes of example in FIGS. 1 and 2 as a stand-alone computing device 20, a computing device such as computing device 60 may, generally, be any component or system that includes a processor or other suitable computing environment for executing software instructions and, for example, need not include a presence-sensitive display.

As shown in the example of FIG. 3, computing device 60 may be a processor that includes functionality as described with respect to processors 40 in FIG. 2. In such examples, computing device 60 may be operatively coupled to presence-sensitive display 64 by a communication channel 62A, which may be a system bus or other suitable connection. Computing device 60 may also be operatively coupled to communication unit 70, further described below, by a communication channel 62B, which may also be a system bus or other suitable connection. Although shown separately as an example in FIG. 3, computing device 60 may be operatively coupled to presence-sensitive display 64 and communication unit 70 by any number of one or more communication channels.

Presence-sensitive display 64 may include display device 66 and presence-sensitive input device 68. Display device 66 may, for example, receive data from computing device 60 and display the graphical content. In some examples, presence-sensitive input device 68 may determine one or more user inputs (e.g., continuous gestures, multi-touch gestures, single-touch gestures, etc.) at presence-sensitive display 64 using capacitive, inductive, and/or optical recognition techniques and send indications of such user input to computing device 60 using communication channel 62A. In some examples, presence-sensitive input device 68 may be physically positioned on top of display device 66 such that, when a user positions an input unit over a graphical element displayed by display device 66, the location at which presence-sensitive input device 68 corresponds to the location of display device 66 at which the graphical element is displayed. In other examples, presence-sensitive input device 68 may be positioned physically apart from display device 66, and locations of presence-sensitive input device 68 may correspond to locations of display device 66, such that input can be made at presence-sensitive input device 68 for interacting with graphical elements displayed at corresponding locations of display device 66.

As shown in FIG. 3, computing device 60 may also include and/or be operatively coupled with communication unit 70. Communication unit 70 may include functionality of communication unit 44 as described in FIG. 2. Examples of communication unit 70 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 60 may also include and/or be operatively coupled with one or more other devices, e.g., input devices, output devices, memory, storage devices, etc. that are not shown in FIG. 3 for purposes of brevity and illustration.

FIG. 3 also illustrates a projector 80 and projector screen 82. Other examples of projection devices may include electronic whiteboards, holographic display devices, and any other suitable devices for displaying graphical content. Projector 80 and projector screen 82 may include one or more communication units that enable the respective devices to communicate with computing device 60. In some examples, the one or more communication units may enable communication between projector 80 and projector screen 82. Projector 80 may receive data from computing device 60 that includes graphical content. Projector 80, in response to receiving the data, may project the graphical content onto projector screen 82. In some examples, projector 80 may determine one or more user inputs (e.g., continuous gestures, multi-touch gestures, single-touch gestures, double-bezel gestures, etc.) at projector screen using optical recognition or other suitable techniques and send indications of such user input using one or more communication units to computing device 60. In such examples, projector screen 82 may be unnecessary, and projector 80 may project graphical content on any suitable medium and detect one or more user inputs using optical recognition or other such suitable techniques.

Projector screen 82, in some examples, may include a presence-sensitive display 84. Presence-sensitive display 84 may include a subset of functionality or all of the functionality of UI device 22 as described in this disclosure. In some examples, presence-sensitive display 84 may include additional functionality. Projector screen 82 (e.g., an electronic whiteboard), may receive data from computing device 60 and display the graphical content. In some examples, presence-sensitive display 84 may determine one or more user inputs (e.g., continuous gestures, multi-touch gestures, single-touch gestures, double-bezel gestures, etc.) at projector screen 82 using capacitive, inductive, and/or optical recognition techniques and send indications of such user input using one or more communication units to computing device 60.

FIG. 3 also illustrates mobile device 86 and visual display device 90. Mobile device 86 and visual display device 90 may each include computing and connectivity capabilities. Examples of mobile device 86 may include e-reader devices, convertible notebook devices, hybrid slate devices, etc. Examples of visual display device 90 may include other semi-stationary devices such as televisions, computer monitors, etc. As shown in FIG. 3, mobile device 86 may include a presence-sensitive display 88. Visual display device 90 may include a presence-sensitive display 92. Presence-sensitive display 92, for example, may receive data from computing device 60 and display the graphical content. In some examples, presence-sensitive display 92 may determine one or more user inputs (e.g., continuous gestures, multi-touch gestures, single-touch gestures, double-bezel gestures, etc.) at projector screen using capacitive, inductive, and/or optical recognition techniques and send indications of such user input using one or more communication units to computing device 60.

As described above, in some examples, computing device 60 may output graphical content for display at presence-sensitive display 64, which is coupled to computing device 60 by a system bus or other suitable communication channel. Computing device 60 may also output graphical content for display at one or more remote devices, such as projector 80, projector screen 82, mobile device 86, and visual display device 90. For instance, computing device 60 may execute one or more instructions to generate and/or modify graphical content in accordance with techniques of the present disclosure. Computing device 60 may output the data that includes the graphical content to a communication unit of computing device 60, such as communication unit 70. Communication unit 70 may send the data to one or more of the remote devices, such as projector 80, projector screen 82, mobile device 86, and/or visual display device 90. In this way, computing device 60 may output the graphical content for display at one or more of the remote devices. In some examples, one or more of the remote devices may output the graphical content at a display device, such as a presence-sensitive display, that is included in and/or operatively coupled to the respective remote device.

In some examples, computing device 60 may not output graphical content at presence-sensitive display 64 that is operatively coupled to computing device 60. In other examples, computing device 60 may output graphical content for display at both a presence-sensitive display 64 that is coupled to computing device 60 by communication channel 62A, and at a display of one or more the remote devices. In such examples, the graphical content may be displayed substantially contemporaneously at each respective device. For instance, some delay may be introduced by the communication latency to send the data that includes the graphical content to the remote device. In some examples, graphical content generated by computing device 60 and output for display at presence-sensitive display 64 may be different than graphical content display output for display at one or more remote devices.

Computing device 60 may send and receive data using any suitable communication techniques. For example, computing device 60 may be operatively coupled to external network 74 using network link 72A. Each of the remote devices illustrated in FIG. 3 may be operatively coupled to network external network 74 by one of respective network links 72B, 72C, 72D, and 72E. External network 74 may include network hubs, network switches, network routers, etc., that are operatively inter-coupled thereby providing for the exchange of information between computing device 60 and the remote devices illustrated in FIG. 3. In some examples, network links 72A-72E may be Ethernet, ATM or other network connections. Such connections may be wireless and/or wired connections.

In some examples, computing device 60 may be operatively coupled to one or more of the remote devices included in FIG. 3 using direct device communication 78. Direct device communication 78 may include communications through which computing device 60 sends and receives data directly with a remote device, using wired or wireless communication. That is, in some examples of direct device communication 78, data sent by computing device 60 may not be forwarded by one or more additional devices before being received at the remote device, and vice-versa. Examples of direct device communication 78 may include Bluetooth, Near-Field Communication, Universal Serial Bus, infrared, etc. One or more of the remote devices illustrated in FIG. 3 may be operatively coupled with computing device 60 by communication links 76A-76E. In some examples, communication links 76A-76E may be connections using Bluetooth, Near-Field Communication, Universal Serial Bus, infrared, etc. Such connections may be wireless and/or wired connections.

In accordance with techniques of the disclosure, computing device 60 can be operable to change a current access mode provided by computing device 60 based at least in part on a received indication of the proximity state of a first structure 96 and a second structure 98 of attachment mechanism 94. For example, as described with respect to FIGS. 1 and 2, computing device 60 may be or be part of a wearable computing device 36. Hence, computing device 60 may be mechanically coupled to an attachment mechanism, which may include or be mechanically coupled to the first and second structures. Computing device 60 may be configured to be operable in a reduced access mode and an increased access mode, as described above. In other examples, computing device 60 may be part of another, separate device from attachment mechanism 94. For example, computing device 60 can be part of a mobile computing device or a separate wearable computing device, or may be a mobile computing device or a separate wearable computing device.

In some examples, computing device 60 can be operable to change a current access mode provided by computing device 60 from an increased access mode to a reduced access mode responsive to receiving an indication of a change of proximity state of the first structure 96 and the second structure 98 of attachment mechanism 94 from a proximate state to a non-proximate state. Alternatively or additionally, in response, computing device 60 may control output of graphical content for display at the remote device in accordance with the change in current access mode.

In some examples, computing device 60 can be operable to receive an indication of a change in the proximity state of the first and second structures 96 and 98 of attachment mechanism 94 from the non-proximate state to the proximate state, and, responsive to receiving the indication, output a security challenge. Outputting the security challenge may include, in some examples, outputting a user interface screen, e.g., displayed at one or more of presence-sensitive displays 64, 84, 88, and 92, that prompts a user of computing device 60 to input a security challenge answer, such as a password, a PIN, a pattern, biometric data (e.g., fingerprint, voice, image, or the like), etc. Responsive to receiving the input security challenge answer, computing device 60 can be operable to compare the input security challenge answer to a stored security challenge answer. Responsive to verifying the input security challenge answer in view of the stored security challenge answer, computing device 60 can be operable to change the current access mode provided by computing device 60 from the reduced access mode to the increased access mode.

In some implementations, once computing device 60 receives the indication that the first and second structures 96 and 98 of attachment mechanism 94 are in a proximate state, computing device 60 can be operable to cause computing device 60 to remain in the increased access mode until computing device 60 receives an indication of a change of the proximity state of the first and second structures 96 and 98 to the non-proximate state, instead of causing computing device 60 to revert to the reduced access mode after a predetermined length of inactivity. As the proximate state may indicate that a user is likely wearing attachment mechanism 94, this may allow the user to interact more fully or completely with computing device 60 (e.g., by providing user input and/or observing outputs of computing device 60 using, for example, one or more of presence-sensitive displays 64, 84, 88, and 92) without having to pass a security challenge each time the user wishes to interact with computing device 60. This may facilitate use of computing device 60 by the user, while maintaining security of computing device 60, as the proximity state of the first and second structures 96 and 98 indicates that the attachment mechanism 94 has not been removed from the user.

Figures 4, 5:
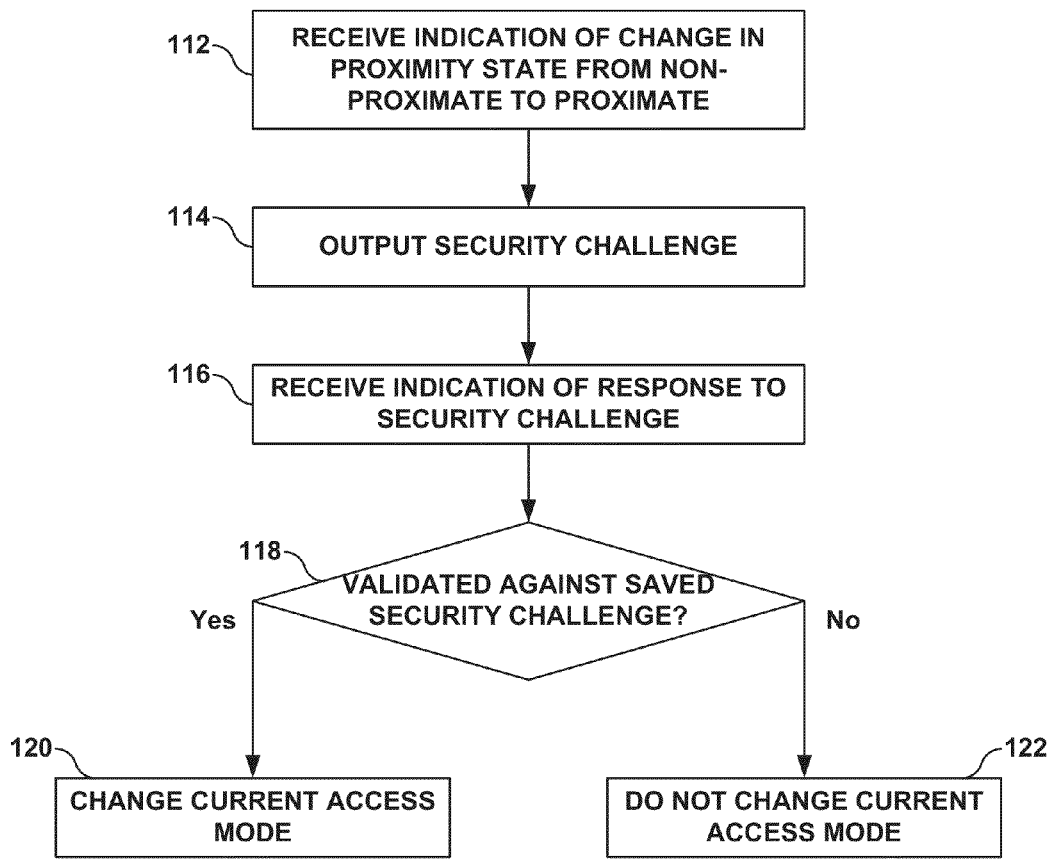
FIGS. 4-7 are flow diagrams illustrating example techniques for controlling a current access mode provided by a computing device based at least in part on the state of an attachment mechanism, in accordance with one or more techniques of the present disclosure.

FIG. 4 is a flow diagram illustrating an example technique for controlling a current access mode provided by a computing device based at least in part on the state of an attachment mechanism, in accordance with one or more techniques of the present disclosure. The technique of FIG. 4 may be performed by a computing device, such as computing device 20 illustrated in FIG. 1, computing device 60 illustrated in FIG. 3, and/or one or more processors 40 illustrated in FIG. 2. For purposes of illustration, the technique of FIG. 4 is described below within the context of wearable computing device 36 of FIG. 1 and FIG. 2, although the technique of FIG. 4 may be performed by computing devices having configurations different than that of wearable computing device 36.

The technique of FIG. 4 includes receiving, by access mode module 26, an indication of a change in a proximity state of first structure 30a and second structure 30b (102). As describe above, the indication of the change in the proximity state may include, for example, an electrical signal. In some examples, first structure 30a and second structure 30b are portions of an electrical circuit passing through band 28 and clasp 32, such that when first structure 30a and second structure 30b are proximate, a complete electrical circuit is formed and an electrical signal can pass from a voltage source included in or associated with wearable computing device 36 through the electrical circuit. In some of these examples, the voltage source may continually, periodically, or aperiodically attempt to output the electrical signal. When the first structure 30a is proximate to or contacting second structure 30b, the electrical signal may pass through the circuit and be detected by a detector. However, when first structure 30a is not proximate to or contacting second structure 30b, the circuit is open and the electrical signal will not pass through the circuit. Hence, the indication of the change in the proximity state may be based on whether the electrical circuit is opened or closed.

In other examples, the first and second structures 30a and 30b can be other mechanisms that can indicate whether band 28 is closed or open. For example, first structure 30a may be a magnet and second structure 30b may be a magnetic switch. As other examples, first structure 30a may be a proximity sensor and second structure 30b may be a structure that is disposed adjacent to first structure 30a when band 28 is closed, first structure 30a may be a spring-loaded pin and second structure may be a contact point or receptacle for the pin, etc. Regardless of the nature of first structure 30a and second structure 30b, first and second structures 30a and 30b may be operable to generate or facilitate generation of one or more signals indicative of a change in proximity state between first and second structures 30a and 30b.

The change of proximity state may be, for example, between a non-proximate state and a proximate state, or between the proximate state and the non-proximate state. The technique of FIG. 4 also includes changing, by access mode module 26, based at least in part on the indication of the change in proximity state of first structure 30a and second structure 30b, a current access mode provided by computing device 20 (104). In some examples, access mode module 26 may change the current access mode from a reduced access mode to an increased access mode based at least in part on an indication that the proximity state of first structure 30a and second structure 30b has changed from a non-proximate state to a proximate state. In some examples, access mode module 26 can be operable to base the change in current access mode on other, additional information, e.g., as described below with respect to FIGS. 5 and 6. Access mode module 26 can also be operable to change the current access mode from the increased access mode to the reduced access mode based at least in part on an indication of a change in the proximity state of first structure 30a and second structure 30b from the proximate to the non-proximate states.

FIG. 5 is another flow diagram illustrating an example technique for controlling a current access mode provided by a computing device based at least in part on the state of an attachment mechanism, in accordance with one or more techniques of the present disclosure. The technique of FIG. 5 may be performed by a computing device, such as computing device 20 illustrated in FIG. 1, computing device 60 illustrated in FIG. 3, or one or more processors 40 illustrated in FIG. 2. For purposes of illustration, the technique of FIG. 5 is described below within the context of wearable computing device 36 of FIG. 1 and FIG. 2, although the technique of FIG. 5 may be performed by computing devices having configurations different than that of wearable computing device 36.

The technique of FIG. 5 includes receiving, by access mode module 26, an indication of a change in the proximity state of first structure 30a and second structure 30b from non-proximate to proximate (112). Responsive to receiving the indication of the change in the proximity state, access mode module 26 can be operable to output a security challenge or cause UI module 24 to output a security challenge (114). For example, access mode module 26 can be operable to output information that causes UI module 24 to generate and output for display a user interface screen that prompts a user of wearable computing device 36 to input a security challenge answer. The security challenge may include a prompt for one or more of a variety of identity verification information, such as a password, a PIN, a pattern, biometric data (e.g., fingerprint, voice, image, retina, or the like), etc. Responsive to receiving the input security challenge answer from the user (e.g., using UI device 22), UI module 24 can be configured to communicate an indication of the security challenge answer to access mode module 26, which receives the indication of the response to the security challenge (116).

Upon receiving the security challenge answer, access mode module 26 can be operable to validate the input security challenge answer against a stored security challenge answer (e.g., input by the user at a previous time and saved at a memory of wearable computing device 36) (118). Responsive to verifying the input security challenge answer in view of the stored security challenge answer (e.g., determining that the input security challenge matches the saved security challenge answer exactly or within a threshold margin of error), access mode module 26 can be operable to change the current access mode provided by computing device 60 from the reduced access mode to the increased access mode (120). However, if access mode module 26 determines that the security challenge answer does not match the saved security challenge answer exactly or within a threshold margin of error, access mode module 26 may refrain from changing the current access mode (122), even in instances in which the proximity state indication indicates that first structure 30a is proximate to or contacting second structure 30a. In this way, the security challenge provides additional security, ensuring that the user wearing wearable computing device 36 is a user authorized to access the increased access mode provided by computing device 20.

Figure 6:
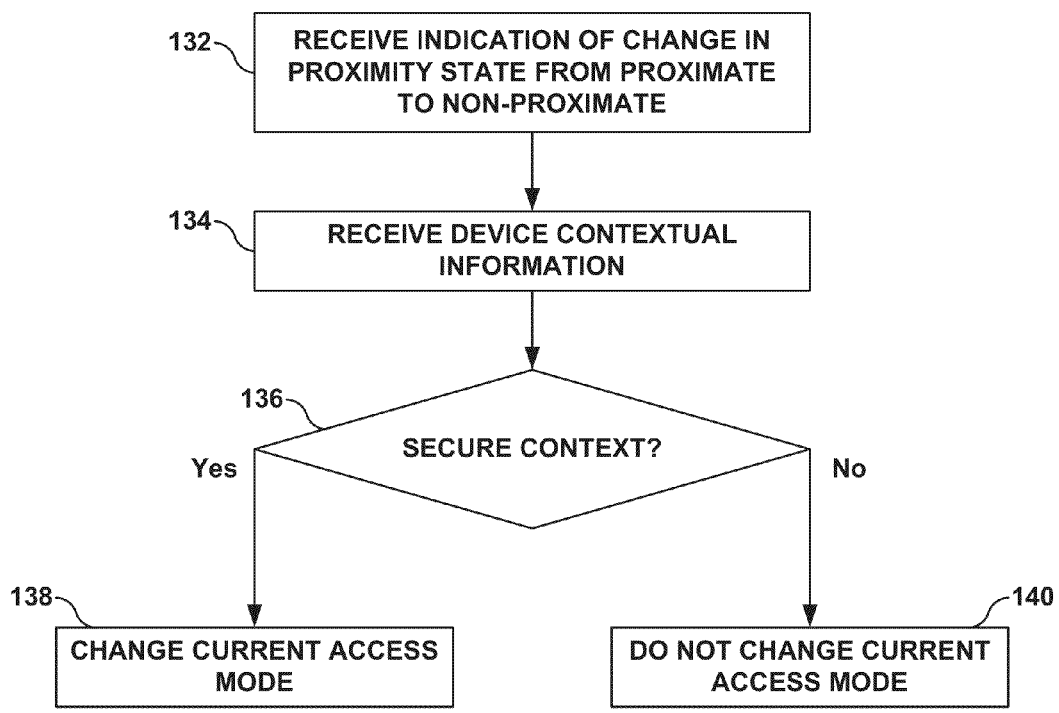

FIG. 6 is a flow diagram illustrating an example technique for controlling a current access mode provided by a computing device based at least in part on the state of an attachment mechanism, in accordance with one or more techniques of the present disclosure. The technique of FIG. 6 may be performed a computing device, such as computing device 20 illustrated in FIG. 1, computing device 60 illustrated in FIG. 3, and/or one or more processors 40 illustrated in FIG. 2. For purposes of illustration, the technique of FIG. 6 is described below within the context of wearable computing device 36 of FIG. 1 and FIG. 2, although the technique of FIG. 6 may be performed by computing devices having configurations different than that of wearable computing device 36.

The technique of FIG. 6 includes receiving, by access mode module 26, an indication of a change in the proximity state of first structure 30a and second structure 30b from proximate to non-proximate (132). Additionally, the technique of FIG. 6 includes receiving, by access mode module 26, device contextual information (134). In some examples, access mode module 26 can be operable to request device contextual information from one or more other components of wearable computing device 36 in response to receiving the indication of the change in the proximity state. In other example, access mode module 26 can be operable to periodically or aperiodically receive device context information.

As described above, device context information can include, for example, location information, time of day information, device movement information, etc. In situations in which the access mode module 26 is operable to collect device context information, the user(s) associated with wearable computing device 36 can be provided (e.g., by wearable computing device 36) with an opportunity to control whether access mode module 26 collects and/or uses the device context information. In addition, certain information, such as the location of wearable computing device 36, may be treated in one or more ways before it is stored or used, so that personally identifiable information is removed. For example, a user's identity may be treated so that no personally identifiable information can be determined for the user, or a user's location may be generalized as to where location information is obtained (such as to a city, ZIP code, or state level), so that a particular location of a user cannot be determined. Thus, the user(s) of wearable computing device 36 may have control over how information about the user is collected and used.

Access mode module 26 can be operable to determine whether wearable computing device 36 is in a relatively high security context (136) based at least in part on the device contextual information. For example, a geographical location of wearable computing device 36 may indicate whether computing device is in a context which is relatively secure or in a context which is relatively unsecure. A location designated as the user's home or office may be considered relatively secure, while a location other than a relatively secure location may be considered relatively unsecure. For example, a location designated as associated with a store, school, stadium, or other public place may be considered relatively unsecure.

Additionally or alternatively, access mode module 26 can be operable to receive time of day information and base the determination of whether to change the current access mode to the reduced access mode based at least in part on the time of day information. The time of day information may indicate the time of day at which access mode module 26 received the indication in the change of the proximity state of first structure 30*a* and second structure 30*b*. The time of day also may indicate whether computing device is likely to be in a context which is relatively secure or a context that is relatively unsecure. For example, if the time of day indicates that is the middle of the night, it may be more likely that the user (and wearable computing device 36) is located at a relatively more secure location (e.g., a location at which the user is sleeping). On the other hand, if the time of day indicates that it is the middle of the day, it may be more likely that the user (and wearable computing device 36) is located in a relatively less secure location (e.g., away from the user's home).

Additionally or alternatively, access mode module 26 can be operable to receive information regarding whether wearable computing device 36 is moving. For example, an indication that wearable computing device 36 is not moving, combined with the indication that the proximity state has changed from proximate to non-proximate, indicates that it is likely that wearable computing device 36 is not being worn and has been left lying at a location by the user.

Access mode module 26 can be operable to analyze one or more types of device contextual information, in combination with the indication of the change in the proximity state of first structure 30*a* and second structure 30*b* from proximate to non-proximate, when determining whether to change the current access mode from the increased access mode to the reduced access mode. For example, if two or three of the types of device context information indicate that wearable computing device 36 is in a relatively unsecure context, access mode module 26 can be operable to change, based on the indication in the change of the proximity state and the device contextual information, the current access mode to the reduced access mode (138). As another example, if only one of the types of device context information indicates that wearable computing device 36 is in a relatively unsecure context (or all of the device contextual information indicates that the device is in a relatively secure context), access mode module 26 can be operable to not change the current access mode to the reduced access mode (140). In other examples, access mode module 26 can be operable to change the current access mode (138) in instances in which any of the device contextual information indicates that wearable computing device 36 is likely in a relatively unsecure context.

In some examples, instead of basing the determination of whether or not to change the current access mode at least in part on the device context information, access mode module 26 can be operable to determine a temporal delay between receiving the indication of the change in proximity state and access mode module 26 changing the current access mode. For example, in instances in which at least one type of the device context information indicates that wearable computing device 36 is likely to be in a relatively unsecure context, access mode module 26 can be operable to change the current access mode to the reduced access mode (138) within a relatively short time (e.g., seconds or a few minutes) of receiving the indication of the change in proximity state of first structure 30*a* and second structure 30*b*. As another example, in instances in which at least one type of the device context information indicates that wearable computing device 36 is likely to be in a relatively secure context, access mode module 26 can be operable to change the current access mode to the reduced access mode after a relatively longer time (e.g., a few minutes or more) of receiving the indication of the change in proximity state of first structure 30*a* and second structure 30*b*.

Figure 7:
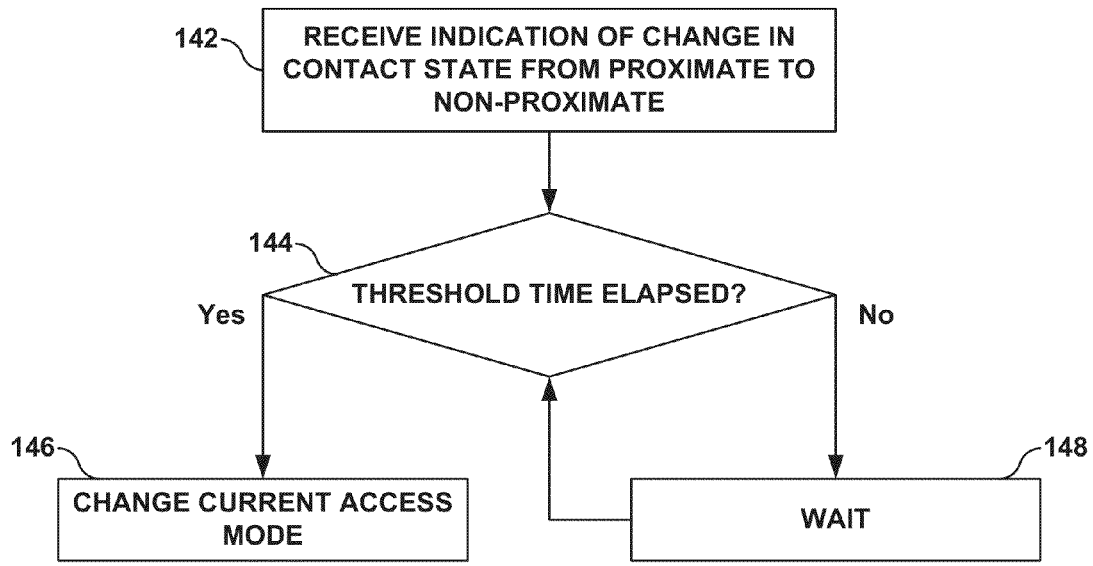

FIG. 7 is a flow diagram illustrating an controlling a current access mode provided by a computing device based at least in part on the state of an attachment mechanism, in accordance with one or more techniques of the present disclosure. The technique of FIG. 7 may be performed by a computing device, such as computing device 20 illustrated in FIG. 1, computing device 60 illustrated in FIG. 3, and/or one or more processors 40 illustrated in FIG. 2. For purposes of illustration, the technique of FIG. 7 is described below within the context of wearable computing device 36 of FIG. 1 and FIG. 2, although the technique of FIG. 7 may be performed by computing devices having configurations different than that of wearable computing device 36.

The technique of FIG. 7 includes receiving, by access mode module 26, an indication of a change in the proximity state of first structure 30*a* and second structure 30*b* from a proximate state to a non-proximate state (142). Responsive to receiving the indication, access mode module 26 can be operable to determine whether a threshold amount of time has elapsed (144). In some examples, the threshold amount of time may be predefined, e.g., within access mode module 26 or by a user of wearable computing device 36. In other examples, as described above, access mode module 26 can be operable to determine the threshold amount of time based on device context information. For example, when the device context information indicates that wearable computing device 36 is likely in a relatively less secure context, access mode module 26 can be operable to determine the threshold amount of time to be lower (e.g., second or a few minutes). When the device context information indicates that wearable computing device 36 is likely in a relatively more secure context, access mode module 26 can be operable to determine the threshold amount of time to be longer (e.g., a few minutes or more).

Responsive to determining that the threshold amount of time has not elapsed (the "NO" branch of decision block 144), access mode module 26 can be operable to wait (148) and not change the current access mode provided by computing device 20. However, responsive to determining that the threshold amount of time has elapsed (the "YES" branch of decision block 144) without receiving an indication of a change of the proximity state from non-proximate to proximate, access mode module 26 can be operable to change the current access mode from the increased access mode to the reduced access mode (146). By waiting for an amount of time before changing the current access mode, access mode module 26 may provide time, e.g., for a user to remove wearable computing device 36 to perform a short task, such as washing his or her hands, put the wearable computing device 36 back on, and not be required to pass a security challenge to access the complete set of functionality provided by computing device 20.

Figure 8:
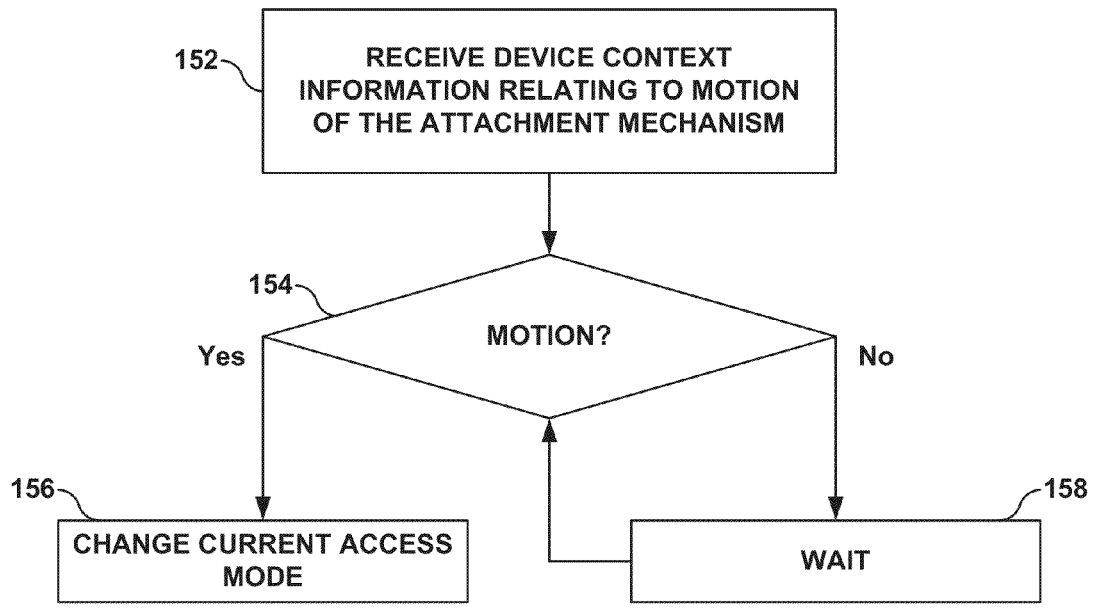
FIG. 8 is a flow diagram illustrating an example technique for controlling a current access mode provided by a computing device based at least in part on detecting motion or absence of motion of an attachment mechanism, in accordance with one or more techniques of the present disclosure.

FIG. 8 is a flow diagram illustrating an example technique for controlling a current access mode of a wearable computing device based at least in part on detecting motion or absence of motion of the wearable computing device, in accordance with one or more techniques of the present disclosure. The technique of FIG. 8 may be performed by a computing device, such as computing device 20 illustrated in FIG. 1, computing device 60 illustrated in FIG. 3, and/or one or more processors 40 illustrated in FIG. 2. For purposes of illustration, the technique of FIG. 7 is described below within the context of wearable computing device 36 of FIG. 1 and FIG. 2, although the technique of FIG. 8 may be performed by computing devices having configurations different than that of wearable computing device 36.

In some examples, the technique of FIG. 8 may be implemented by computing device 20 while the proximity state of first structure 30a and second structure 30b of band 30 is proxiamte. The technique of FIG. 8 includes receiving, by access mode module 26, device context information relating to motion of wearable computing device 36 (152). In some examples, access mode module 26 can be operable to periodically or aperiodically request device contextual information from one or more other components of wearable computing device 36. In other example, access mode module 26 can be operable to periodically or aperiodically receive device context information. In some examples, wearable computing device 36 includes at least one sensor 54 (FIG. 2) that can output a signal indicative of movement of wearable computing device 36. Such a sensor may include, for example, an accelerometer, a gyroscope, a camera, etc.

Access mode module 26 can be operable to receive the device context information (152) and determine, based at least in part on the device context information, whether wearable computing device 36 is moving (154). In some examples, access mode module 26 may determine whether wearable computing device 36 is moving based on an output of an accelerometer or a gyroscope that indicates the wearable computing device 36 is or is not moving. In other examples, access mode module 26 may determine whether wearable computing device 36 is moving based on a comparison (e.g., by one or more processors 40) of two images captured by a camera at different times (e.g., separated by fractions of a second, seconds or minutes). In instances in which the images are different, access control module 26 may determine that wearable computing device 36 is moving or has moved. In instances in which the images are substantially the same, module 26 may determine that wearable computing device 36 is substantially stationary or has not moved.

Access mode module 26 can be operable to determine whether to change the current access mode provided by computing device 20 based at least in part on the indication of whether wearable computing device 36 is moving. For example, access mode module 26 can be operable to change the current access mode provided by computing device 20 (156) in response to determining that wearable computing device 36 has been substantially stationary for longer than a threshold amount of time (the "YES" branch of decision block (154)). As another example, access mode module 26 can be operable to not change the current access mode provided by computing device 20 (156) in response to determining that wearable computing device 36 is moving or has not been substantially stationary for longer than a threshold amount of time (the "NO" branch of decision block (154)). Hence, in some examples, even when first structure 30a and second structure 30b of band 30 are proximate, access mode module 26 can be operable to change the current access mode provided by one or more processors 40 after a threshold time period during which wearable computing device 36 is substantially stationary.

Although various examples have been described with reference to different figures, features of the examples and the examples themselves may be combined in various combinations. For example, access mode module 26 can be operable to both output a security challenge in response to receiving an indication of a change in the proximity state of first structure 30a and second structure 30b from a non-proximate state to a proximate state, and to receive device context information in a single example. Other examples of combinations of features described herein are possible and within the scope of this disclosure and the claims.

In one or more examples, the functions described herein may be implemented in hardware, software, firmware, or any combination thereof. If implemented in software, the functions may be stored on or transmitted over, as one or more instructions or code, a computer-readable medium or computer-readable storage device and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media or computer-readable storage device, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, include compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   receiving, by one or more processors of a wearable computing device, an indication that a first structure of a physical attachment mechanism of the wearable computing device is proximate to a second structure of the physical attachment mechanism;
   responsive to receiving the indication that the first structure of the physical attachment mechanism of the wearable computing device is proximate to the second structure of the physical attachment mechanism, outputting, by the one or more processors and for display by the wearable computing device, a security challenge;
   receiving, by the one or more processors, an indication of a response to the security challenge; and
   responsive to receiving the indication of the response to the security challenge, changing, by the one or more processors, based at least in part on the indication that the first structure of the physical attachment mechanism of the wearable computing device is proximate to the second structure of the physical attachment mechanism, and the indication of the response to the security challenge, a current access mode of a computing environment of the wearable computing device from a reduced access mode to an increased access mode in which a user is permitted access to a larger set of functionality provided by the one or more processors of the wearable computing device than when in the reduced access security mode.

2. The method of claim 1, further comprising:
   receiving, by the one or more processors, an indication that the first structure is no longer proximate to the second structure; and
   responsive to receiving the indication that the first structure is no longer proximate to the second structure, changing the current access mode of the computing environment of the wearable computing device from the increased access mode to the reduced access mode.

3. The method of claim 2, wherein the indication that the first structure is no longer proximate to the second structure comprises an indication that the physical attachment mechanism is no longer physically intact.

4. The method of claim 1, wherein the first structure comprises a first electrical circuit element and wherein the second structure comprises a second electrical circuit element.

5. The method of claim 1, wherein the first structure comprises a pin and the second structure comprises a pin contact.

6. The method of claim 1, further comprising:
   receiving, by the one or more processors, device context information relating to at least one of a geographic location of the wearable computing device, motion of the physical attachment mechanism, and a time at which the one or more processors received the indication that the first structure of the physical attachment mechanism is proximate to the second structure of the physical attachment mechanism, and
   wherein changing the current access mode provided by the one or more processors comprises changing, based at least in part on the indication that the first structure of the physical attachment mechanism is proximate to the second structure of the physical attachment mechanism, the indication of the response to the security challenge, and the device context information, the current access mode of the computing environment of the wearable computing device.

7. The method of claim 1, further comprising:
   receiving, by the one or more processors, device context information relating to motion of the computing device; and
   changing, by the one or more processors, based at least in part on the device context information, the current access mode of the computing environment of the wearable computing device from the increased access mode to the reduced access mode.

8. A wearable computing device comprising:
   a physical attachment mechanism comprising a first structure and a second structure;
   one or more processors; and
   an access mode module operable by the one or more processors to:
     receive an indication that the first structure is proximate to the second structure,
     responsive to receiving the indication that the first structure is proximate to the second structure, output a security challenge,
     receive an indication of a response to the security challenge, and
     change, based at least in part on the indication that the first structure is proximate to the second structure and the indication of the response to the security challenge, a current access mode of a computing environment of the wearable computing device from a reduced access mode to an increased access mode in which a user is permitted access to a larger set of functionality provided by the one or more processors of the wearable computing device than when in the reduced access security mode.

9. The wearable computing device of claim 8, wherein the access mode module is further operable by the one or more processors to:
   receive an indication that the first structure is no longer proximate to the second structure, and
   responsive to receiving the indication that the first structure is no longer proximate to the second structure, change the current access mode of the computing environment of the wearable computing device from the increased access mode to the reduced access mode.

10. The wearable computing device of claim 9, wherein receiving the indication that the first structure of the physical attachment mechanism is no longer proximate to the second structure of the physical attachment mechanism comprises receiving an indication that the physical attachment mechanism is no longer physically intact.

11. The wearable computing device of claim 8, wherein the first structure comprises a first electrical circuit element and wherein the second structure comprises a second electrical circuit element.

12. The wearable computing device of claim 8, wherein the first structure comprises a pin and the second structure comprises a pin contact.

13. The wearable computing device of claim 8, wherein the access mode module is further operable to:

receive device context information relating to at least one of a geographic location of the wearable computing device, motion of the wearable computing device, and a time at which the access mode module received the indication of the change in the proximity state between the first structure and the second structure from a non-proximate state to a proximate state, and change, based at least in part on the indication that the first structure is proximate to the second structure, the indication of the response to the security challenge, and the device context information, the current access mode of the computing environment of the wearable computing device from the reduced access mode to the increased access mode.

14. The wearable computing device of claim 13, wherein the wearable computing device further comprises an accelerometer, and wherein the device context information comprises an indication, based at least in part on an output of the accelerometer, that the device is moving.

15. The wearable computing device of claim 8, wherein the access mode module is further operable to:
receive device context information relating to motion of the wearable computing device, and
change, based at least in part on the device context information, the current access mode of the computing environment of the wearable computing device from the increased access mode to the reduced access mode.

16. A computer-readable storage device storing instructions that, when executed, cause at least one processor to:
receive an indication that a first structure of a physical attachment mechanism is proximate to a second structure of the physical attachment mechanism;
responsive to receiving the indication that the first structure of the physical attachment mechanism is proximate to the second structure of the physical attachment mechanism, output a security challenge;
receive an indication of a response to the security challenge;
receive device context information relating to at least one of a geographic location of the physical attachment mechanism, motion of the physical attachment mechanism, and a time at which the at least one processor received the indication that the first structure of the physical attachment mechanism is proximate to the second structure of the physical attachment mechanism; and
change, based at least in part on the indication the indication that the first structure of the physical attachment mechanism is proximate to the second structure of the physical attachment mechanism, the indication of the response to the security challenge, and the device context information, a current access mode of a computing environment associated with the at least one processor from a reduced access mode to an increased access mode.

17. The computer-readable storage device of claim 16, wherein the device context information comprises first device context information, further comprising instructions that, when executed, cause the at least one processor to:
receive second device context information relating to motion of the physical attachment mechanism, and
change, based at least in part on the second device context information, the current access mode of the computing environment associated with the at least one processor from the increased access mode to the reduced access mode.

18. The computer-readable storage device of claim 16, further comprising instructions that, when executed, cause the at least one processor to:
receive an indication that the first structure is no longer proximate to the second structure; and
change, based at least in part on the indication that the first structure is no longer proximate to the second structure, the current access mode of the computing environment associated with the at least one processor from an increased access mode to a reduced access mode.

19. The computer-readable storage device of claim 18, wherein the indication comprises an indication that the physical attachment mechanism is no longer physically intact.

20. The computer-readable storage device of claim 16, wherein the first structure comprises a first electrical circuit element and wherein the second structure comprises a second electrical circuit element.

21. The computer-readable storage device of claim 16, wherein the first structure comprises a pin and the second structure comprises a pin contact.

22. The computer-readable storage device of claim 16, wherein a wearable computing device comprises the at least one processor and the physical attachment mechanism.

23. The method of claim 2, further comprising:
remaining, by the computing device, in the increased access mode until receiving the indication that the first structure is no longer proximate to the second structure.

24. The wearable computing device of claim 9, wherein the access mode module is further operable by the one or more processors to:
cause the wearable computing device to remain in the increased access mode until receiving the indication that the first structure is no longer proximate to the second structure.

25. The computer-readable storage device of claim 18, further comprising instructions that, when executed, cause the at least one processor to:
remain in the increased access mode until receiving the indication that the first structure is no longer proximate to the second structure.

* * * * *